3,175,909
PROCESS OF PREPARING PROTEIN FIBERS USING SAFFLOWER SEED MEAL AND RESULTING PRODUCT
Lyle F. Elmquist, North St. Paul, Minn., assignor to General Mills, Inc., a corporation of Delaware
No Drawing. Filed Sept. 24, 1962, Ser. No. 225,899
9 Claims. (Cl. 99—17)

The present invention relates to the preparation of fibers from safflower meal, to the resulting fibers and to food products prepared from said fibers.

Artificial fibers have been prepared from various vegetable proteins such as soy, corn and peanut protein as well as animal proteins such as casein and keratin. These protein fibers are prepared by the creation of a spinning dope of the protein which is then extruded into a coagulating bath to produce filaments.

As a preliminary step in the preparation of protein fibers, it has heretofore been necessary to effect a substantial separation of the protein from other substances associated with it in the natural product in which it occurs. For example, in the preparation of a spinning solution or dope from soy protein, it is necessary to prepare an isolate containing a very high percentage of protein, i.e., 90% by weight or more. One of the common methods for preparing such an isolate is to suspend oil-free soybean meal, obtained by low temperature solvent extraction, in water containing a sufficient amount of alkali to dissolve the protein while leaving undissolved, for example, polysaccharides and certain other materials contained in the meal. After separation of the extract from the insoluble materials, the protein is precipitated, for example, by the addition of acid. It is then collected by filtration or centrifugation.

The preparation of the described protein isolates is expensive and time consuming. Furthermore, it is difficult to prepare spinning solutions therefrom containing more than about 18% solids since higher concentrations of the isolated soy proteins produce gelling or dopes which are too viscous for spinning.

I have now discovered that protein fibers can be prepared directly from safflower seed meal without having to first isolate the protein contained therein. I have also discovered that spinning solutions containing 25% by weight or more solids can be prepared from the safflower seed meal. Additionally, the fibers prepared according to my invention are bland in contrast to the beany-bitterness associated with fibers prepared from soy beans for example.

It is, therefore, an object of the present invention to provide a process for preparing protein fibers from safflower seed meal.

Another object of the invention is to provide novel protein fibers prepared from safflower seed meal.

Still another object of the invention is to provide simulated food products from said novel fibers.

These and other objects will become apparent from the following detailed description of the invention.

The safflower seed meal utilized as the starting material in the present invention is obtained by dehulling and deoiling naturally occurring safflower seeds. Such dehulling and deoiling can be accomplished by conventional procedures. Preferably, the oil is removed by solvent extraction. Suitable solvents include petroleum solvents such as hexane, carbon tetrachloride and the like. After the extraction, the dehulled and substantially oil-free seeds are desolventized by any suitable method to remove residual solvent(s) and then preferably ground to a relatively fine particle size to facilitate the preparation of the spinning solution or dope. The term safflower seed meal as used herein means a material prepared by removing the hulls and a substantial portion of the oil from safflower seeds. The meal may contain up to about 15% by weight oil but preferably contains 10% by weight or less of the oil.

The spinning dope can be prepared by dispersing the safflower seed meal in a dispersing medium in varying amounts. As indicated above, the meal can be used in concentrations of 25% by weight or even higher. Preferably the amount of the meal in the spinning dope will be from about 20 to 30% by weight. If desired, the dope can be prepared from mixtures of the safflower seed meal and other edible protein materials. A suitable dispersing medium is water containing an alkaline material, i.e., about 1 to 10% by weight alkali metal hydroxide. The pH of the spinning solution or dispersion can vary within relatively wide limits, but will generally be in the range of about 9 to 13.5. The viscosity and temperature of such dispersions will generally be within the range of about 5,000 to 100,000 centipoises and about 20–45° C., respectively. It is understood that the viscosity, pH, temperature and concentrations of alkali metal hydroxide and safflower seed meal can vary over relatively wide limits to produce a suitable spinning dope. It is also understood that the dispersion or dope may amount to a colloidal solution and that the use of the terms dispersion or colloidal solution in the claims is inclusive of the other.

After formation of the dispersion or spinning dope, it is forced through a small orifice or opening into a coagulating bath which can be an acid-salt solution. If a single filament is desired, the solution may be forced through a device having a single opening, the diameter of which can be varied according to the size of the filament desired. A porous membrane, such as a spinneret used in the production of rayon, containing a plurality of openings can be used where more than one, i.e., a tow of filaments is to be produced. The streamlets coming through the spinneret are precipitated in the acid-salt bath in the form of a tow of filaments. A conventional spinneret, which is actually a small die having from perhaps five thousand to fifteen thousand holes each on the order of 0.003–0.004 inch in diameter, will produce filaments of a diameter of about 0.003–0.004 inch. It is also possible to have a series of spinnerets producing filaments from the safflower seed meal dispersion. Such spinnerets may have the same or different number of holes making it possible to directly produce tows of filaments having the same or different diameters.

The coagulating bath contains an acid constituent and is preferably an aqueous solution of salt and an acid. The salt (i.e., NaCl, for example) can be used in widely varying concentrations, such as from about 0.5 to 15% by weight. Representative acidic compounds are acetic acid, lactic acid, citric acid, adipic acid, hydrochloric acid and the like. The concentration of said acids in the bath is not critical and may vary between about 0.5 to 10% by weight.

The following examples serve to illustrate the preparation of fibers according to the present invention.

*Example 1*

To a dispersion of 12.5 g. safflower seed meal in 37.5 g. water was added 4.92 g. of a 10% aqueous solution of NaOH. The safflower seed meal had the following analysis:

Percent protein _____ 58.25
Percent oil _____ 6.10
Percent water _____ 8.6

The meal was prepared by hexane extraction of dehulled safflower seed meats. The blend was stirred at 40° C. until smooth. The spinning dope was cooled to 25° C. and a portion thereof placed in a syringe attached to a No. 23 needle (0.013 inch diameter bore). A streamlet of the dope was forced through the needle into an aqueous precipitating bath consisting of 0.1 N HCl and 10% by weight NaCl. The filament formed in the bath was almost white, bland and had good strength and elasticity.

*Example II*

A tow of filaments is produced by forcing a spinning dope, prepared in exactly the same manner and using the same safflower seed meal as in Example I, through a rayon spinneret into a coagulating bath composed of water containing 10% NaCl and 1.5% lactic acid. The resulting filaments are of good color, strength and elasticity. The filaments are also bland and thus very desirable for use in preparing simulated food products.

The present invention also relates to simulated food products prepared from the safflower seed meal filaments or fibers. Such food products can be prepared by squeezing excess coagualting solution from the fibers and then impregnating the fibers with binders, flavoring agents and the like. However, before impregnation the fibers or bundles thereof (tows) are preferably stretched, passed through a neutralizing bath and/or water washed.

The filaments or tows thereof are stretched by pulling them from the coagulating bath over a take-away reel(s). Preferably, stretching tensions of 50–400% are applied. It is understood, however, that higher or lower tensions can be used and also that the stretching can be performed on a series of reels each with an increasing rate of speed or an increased stretching tension. It is further understood that the stretching of the fibers can take place in the coagulating bath, after emergence thereof from said bath, or partly in the bath and partly after emergence from the bath.

The filaments or bundles thereof (tows) leaving the coagulating bath may be too acidic which is undesirable since food products prepared therefrom would have a sour taste and could be dry and tough. Thus, said filaments are preferably passed through a neutralizing bath. Such a bath can be a salt solution containing an alkaline material such as an alkali metal hydroxide, bicarbonate or the like. Alternatively, the filaments or bundles thereof can be neutralized by spraying them with a neutralizing solution while they are being stretched or being conveyed to the next step in the process. Also, the excess acidity can be removed by water washing. However, such procedure may require more handling time and somewhat more processing steps. The pH of the fibers should preferably be in the range of about 5.5 to 6.4 which is the pH of most natural meats. However, the pH may be lower or higher than the preferred range, such as from about 4.0 to about 7.0, if desired.

The filaments are freed from excess coagulating, neutralizing and/or washing solution and impregnated with binders, flavoring agents and the like. The binder preferably consists of, or contains a substanital proportion of, a heat coagulable protein such as albumen. Various flavors which are available commercially can be added. Representative thereof are bouillon cubes having chicken, beef and other meat flavors. Synthetic ham, bacon, and sausage flavors may also be used. Additionally, various spices and salts can be employed to further flavor the fibers.

Vegetable oils and animals fats and oils can also be added to the fibers. Representative thereof are soybean oil, cottonseed oil, corn oil, coconut oil, palm kernel oil, olive oil, peanut oil, sesame seed oil, safflower oil, tallow, lard, chicken fat, butter, cod-liver oil and the like. The said oils and fats may be partially or fully hydrogenated.

The binder, flavoring agents, oils and fats can be added to the fibers separately. Thus, the fibers can first be passed through a bath containing the binder and, preferably also, the flavoring agents. The fibers can then be passed through a bath of the oil or melted fat. It is also understood that the individual fibers or bundles thereof of different sizes can be treated with the above-described agents to simulate meats of different textures.

The binders, oils or fats and flavoring agents can also be applied to the fibers in a single operation. Thus, the various additives can be emulsified and the fibers passed through said emulsion to provide an even distribution of the binder, fat and flavoring agents in the simulated food product. Any edible emulsifier can be used to prepare the additive emulsion. Representative of such emulsifiers are: mono- and diglycerides of fatty acids, such as monostearin, monopalmitin, monoolein, and dipalmitin; higher fatty acid esters of sugars, such as sucrose partial palmitate and sucrose partial oleate; phosphoric and sulfuric acid esters, such as dodecyl glyceryl ether sulfates and moonstearin phosphate; partial esters of glycerol and both higher and lower fatty acids, such as glyceryl lactopalmitate; and polyoxyalkylene ethers of fatty esters of polyhydric alcohols, such as the polyoxyethylene ethers of sorbitan monostearate and sorbitan distearate.

Dyes and pigments or other coloring material may also be added to the fibers. They can be added to the spinning dispersion, to the coagulating bath or to the neutralized fibers. Preferably, the dyes are added at the same time as the other additives.

The impregnated fibers are then preferably setup by heating, such as by baking, broiling, boiling and the like. One preferred method is to treat the fibers directly with steam. This can be accomplished in a variety of ways. Thus, the fiber tow can be pulled continuously through jets of live steam, or, more efficiently through a partially enclosed chamber having a steam inlet, such as a steam tower. The tower can be so positioned that the impregnated tow will pass downwardly through the tower directly from the impregnating bath. The length of time which the impregnated fiber is contacted with steam will vary considerably. Good results are obtained with contact times of a few seconds to about one minute.

The simulated food product, either before or after the described setting-up procedures, can be packaged and sold. However, it can be optionally treated in a variety of ways to provide specialized products. Thus, the treated tow can be cut into pieces or chunks of various sizes to simulate meat such as ham, chicken, tuna or other snack products. The product, either before or after said cutting, can be fried, smoked or dried. The dehydrated products can be readily rehydrated in boiling water. Such dehydrated products find use in gravies, soups, hot dishes and the like. The dehydration can be accomplished at temperatures of about 70–150° F., for example.

The following examples serve to illustrate the preparation of simulated food products from the safflower seed meal fibers of the present invention.

*Example III*

A tow of precipitated fibers prepared as set forth in Example II is taken out of the bath by means of a take-away reel adjusted so that stretch amounting to about 100–200% is exerted on the fibers. One hundred grams of the safflower seed meal fibers are then neutralized with a dilute aqueous sodium bicarbonate solution containing about 1% sodium chloride to raise the pH to about 5.5. Excess neutralizing solution is removed so that the fibers contain about 65% by weight water. The fibers are then impregnated with the following ingredients and amounts:

| | Amount |
|---|---|
| Egg albumen | g 20.0 |
| Flour | g 10.0 |
| Non-fat milk solids | g 10.0 |
| NaCl | g 8.0 |
| Yellow onion powder | g 1.0 |
| Mono-sodium glutamate | g 0.5 |
| Red dye (2% aqueous solution) | ml 1.5 |
| Water | ml 150.0 |

After impregnation, the fibers are placed in pans and baked for 30 min. at 350° F. to produce a simulated food product which has a good meat flavor and eating qualities.

*Example IV*

The set-up meat produce of Example III is dehydrated at about 150° F. The resulting dried product is particularly useful in packaged hot dishes.

It is to be understood that the invention is not to be limited to the exact details of operation or the compositions and methods shown and described, as obvious modifications will be apparent to those skilled in the art and the invention is to be limited only by the scope of the appended claims.

The embodiments of the invention in which an exclusive property or privilege is claimed are defined as follows:

1. A process of preparing protein fibers which comprises forming a dispersion of safflower seed meal in a dispersing medium and forcing the dispersion through an orifice into a coagulation bath to form said fibers.

2. The process of claim 1 wherein the dispersing medium contains alkali metal hydroxide.

3. The process of claim 1 wherein the dispersion comprises from about 20 to 30% by weight of the safflower seed meal.

4. The process of claim 1 wherein the coagulation bath comprises an aqueous acid-salt solution.

5. The process of claim 1 wherein the dispersion is forced through a porous membrane.

6. The process of claim 1 wherein the fibers are recovered from the coagulation bath.

7. The process of claim 6 wherein the fibers are stretched to orient the molecules thereof.

8. The fibers produced by the process of claim 6.

9. In a process of preparing fibers from edible protein material wherein the protein material is dispersed in a dispersing medium and thereafter forced through an orifice into a coagulation bath, the improvement comprising using safflower seed meal as the edible protein material.

References Cited by the Examiner

UNITED STATES PATENTS

| | | | |
|---|---|---|---|
| 2,682,466 | 6/54 | Boyer | 99—14 |
| 3,099,649 | 7/63 | Kawamura et al. | |

A. LOUIS MONACELL, *Primary Examiner.*

BEATRICE H. STRIZAK, *Examiner.*